United States Patent
Childress et al.

(10) Patent No.: US 9,868,505 B2
(45) Date of Patent: Jan. 16, 2018

(54) SYSTEM FOR SECURING AN AIRCRAFT DOOR

(71) Applicant: INTERNATIONAL BUSINESS MACHINES CORPORATION, Armonk, NY (US)

(72) Inventors: Rhonda L. Childress, Austin, TX (US); Kim A. Eckert, Austin, TX (US); Jente B. Kuang, Austin, TX (US); David B. Kumhyr, Austin, TX (US); Ryan D. McNair, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/444,762

(22) Filed: Feb. 28, 2017

(65) Prior Publication Data
US 2017/0166292 A1 Jun. 15, 2017

Related U.S. Application Data

(62) Division of application No. 14/945,755, filed on Nov. 19, 2015, now Pat. No. 9,611,042.

(51) Int. Cl.
*B64C 1/14* (2006.01)
*B64D 11/06* (2006.01)

(52) U.S. Cl.
CPC ........ *B64C 1/1423* (2013.01); *B64D 11/0644* (2014.12)

(58) Field of Classification Search
CPC ....... B64C 1/14; B64C 1/1407; B64C 1/1423; B64C 1/143; B64C 1/1438; B64D 11/0644; B60N 2/4693; B60N 2/468; B60N 2/46
See application file for complete search history.

(56) References Cited

U.S. PATENT DOCUMENTS

| 1,701,491 A | 2/1929 | Casey |
| 1,951,464 A | 3/1934 | Wragg |
| 2,189,748 A | 2/1940 | Wilson |

(Continued)

FOREIGN PATENT DOCUMENTS

| CA | 2444308 A1 | 4/2005 |
| DE | 4221493 | 1/1994 |

(Continued)

OTHER PUBLICATIONS

McLean, "Effects of Seating Configuration and Number Type III Exits on Emergency Aircraft Evacuation", Office of Aviation Medicine, Federal Aviation Administration, Aug. 1992; 13 Pages.

(Continued)

*Primary Examiner* — Richard R Green
(74) *Attorney, Agent, or Firm* — Lisa J. Ulrich; Andrew D. Wright; Roberts Mlotkowski Safran Cole & Calderon, P.C.

(57) ABSTRACT

Systems and methods for securing an emergency exit door on an armrest of a seat are provided. A system includes a latch connected to an armrest of a seat of a vehicle. The latch is moveable relative to the armrest between a stowed position and a deployed position. The latch is structured and arranged to engage an edge of a door that is associated with an exit of the vehicle to hold the door on the armrest.

10 Claims, 6 Drawing Sheets

(56) References Cited

U.S. PATENT DOCUMENTS

| | | | |
|---|---|---|---|
| 2,342,184 A | 2/1944 | Fawcett | |
| 2,348,426 A | 5/1944 | Sparrow | |
| 2,748,855 A | 6/1956 | Siems et al. | |
| 2,793,825 A | 5/1957 | Highley | |
| 3,004,303 A | 10/1961 | Wilmer | |
| 3,830,332 A | 8/1974 | Fontaine | |
| 4,042,193 A | 8/1977 | Cerne | |
| 4,157,797 A * | 6/1979 | Fox | B64D 11/064 244/122 R |
| 4,220,298 A | 9/1980 | Willis | |
| 4,473,201 A | 9/1984 | Barnes et al. | |
| 4,552,326 A | 11/1985 | Bokalot | |
| 5,187,665 A * | 2/1993 | Futami | B60N 2/12 296/65.16 |
| 5,337,977 A | 8/1994 | Fleming et al. | |
| 5,374,104 A | 12/1994 | Moore et al. | |
| 5,577,781 A | 11/1996 | Kallies et al. | |
| 5,984,234 A | 11/1999 | Brouwer et al. | |
| 5,984,415 A | 11/1999 | Schumacher et al. | |
| 6,651,932 B2 | 11/2003 | Diehl et al. | |
| 6,745,982 B2 | 6/2004 | Lehmann | |
| 6,866,226 B2 | 3/2005 | Pratt et al. | |
| 6,866,227 B2 | 3/2005 | Pratt et al. | |
| 7,083,146 B2 * | 8/2006 | Hiesener | B64D 11/0644 244/118.5 |
| 7,207,524 B2 | 4/2007 | Puschmann et al. | |
| 7,255,376 B2 | 8/2007 | Pratt et al. | |
| 7,506,923 B1 | 3/2009 | Gauss | |
| 7,568,659 B2 | 8/2009 | Roques et al. | |
| 7,568,766 B2 | 8/2009 | Chen et al. | |
| 7,578,475 B2 | 8/2009 | Pratt et al. | |
| 8,047,583 B2 | 11/2011 | Clausen | |
| 8,235,162 B2 | 8/2012 | Wihinen | |
| 8,688,329 B2 | 4/2014 | Cathcart | |
| 8,740,148 B2 | 6/2014 | Risch | |
| 9,611,042 B1 * | 4/2017 | Childress | B64D 11/0644 |
| 2009/0152398 A1 | 6/2009 | Risch | |
| 2012/0072034 A1 | 3/2012 | Cathcart | |
| 2016/0083096 A1 | 3/2016 | Gagnon | |
| 2017/0166292 A1 * | 6/2017 | Childress | B64D 11/0644 |
| 2017/0166312 A1 * | 6/2017 | Childress | B64D 11/0644 |

FOREIGN PATENT DOCUMENTS

| | | |
|---|---|---|
| DE | 102008009938 | 9/2009 |
| WO | 2006010437 A1 | 2/2006 |
| WO | 2007100601 A2 | 9/2007 |
| WO | 2009045936 A1 | 4/2009 |
| WO | 2009056476 A1 | 5/2009 |

OTHER PUBLICATIONS

McFadden et al., "The Magnitude and Direction of Forces that Man Can Exert in Operating Aircraft Emergency Exits", Human Factors: The Journal of the Human Factors and Ergonomics Society, Nov. 1959, pp. 16-27.

Air-Raser, "Evacuation Routes", American Airlines MD-80_2, https://www.flickr.com/photos/54048929@N08/6258935946/, Oct. 19, 2011; 2 Pages.

Specification "System for Securing an Aircraft Door" and Drawings in U.S. Appl. No. 15/444,719, filed Feb. 28, 2017, 20 pages.

Office Action from U.S. Appl. No. 15/444,719 dated Jun. 19, 2017. 6 pages.

List of IBM Patents or Patent Applications Treated as Related 1 page.

* cited by examiner

SYSTEM FOR SECURING AN AIRCRAFT DOOR

BACKGROUND

The present invention relates generally to vehicle systems and, more particularly, to systems for securing an aircraft door upon removal of the door from a fuselage.

Many passenger aircraft have an overwing exit that is accessible by a door in the side of the aircraft fuselage. Overwing exits are primarily self-help exits meaning that in an emergency egress the passengers seated immediately adjacent to the exit will be responsible for assessing external hazards and opening the door of the exit. To use the overwing exit, e.g., during an emergency egress situation, the door at the overwing exit is manually unlatched and detached from the fuselage by a person inside the aircraft cabin. In some types of aircraft, the safety briefing card instructs the passenger to pull the door into the cabin and place the door on the armrests of the seats in the exit aisle. This approach is problematic, though, because it is difficult to balance the door on the armrests of the seats without the door sliding off of the armrests and blocking the egress path to the overwing exit. Moreover, even if a first passenger does successfully balance the door on the armrests, another passenger may accidently bump the door and/or seats while making their way to the overwing exit, and this accidental bumping may dislodge the door from the armrests such that the door falls down into the exit row and obstructs the egress path to the overwing exit.

In other types of aircraft, the safety briefing card instructs the passenger to throw the door out of the cabin through the overwing exit. However, this action is problematic in that a door that is thrown out of the overwing exit might land on the wing and pierce the skin of the wing and cause a fuel leak. Another hazard with throwing the door outside the aircraft through the overwing exit is that the door may get stuck on the wing and block egress of the passengers from the cabin. Additionally, the door is typically very heavy, sometimes as much as forty pounds, and it can be difficult for some passengers to throw the door into clear space outside of the aircraft.

SUMMARY

In an aspect of the invention, there is a system that includes a latch connected to an armrest of a seat of a vehicle. The latch is moveable relative to the armrest between a stowed position and a deployed position. The latch is structured and arranged to engage an edge of a door that is associated with an exit of the vehicle to hold the door on the armrest.

In another aspect of the invention, there is a vehicle including: an overwing exit in a fuselage; a door associated with the overwing exit; a seat in an exit row associated with the overwing exit, the seat comprising an armrest; and an element, in the armrest, that is structured and arranged to engage and hold an edge of the door when the door is removed from the overwing exit and placed on the armrest.

In another aspect of the invention, there is a method including: detecting an action at a door associated with an overwing exit at an exit row of an aircraft; and modifying a seat in the exit row based on the detecting the action at the door. The modifying the seat includes at least one of: automatically deploying a latch in an armrest of the seat; automatically rotating a distal end of the armrest downward; and automatically moving the seat to increase a size of an egress path of the exit row.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to vehicle systems and, more particularly, to systems for securing an aircraft door upon removal of the door from a fuselage. According to aspects of the invention, a series of latches are arranged in armrests of seats in an exit row corresponding to an overwing exit in an aircraft. The latches may be actuated manually or automatically upon removal of the door from the overwing exit. In embodiments, an actuated latch extends upward out of the armrest and provides a catch for the door that is placed on the armrest. In this manner, systems of the present invention may be used to prevent the door from falling off the armrest and into the egress path to the overwing exit.

Embodiments of the invention are described with respect to an overwing exit of an aircraft. However, the implementations of the invention are not limited to aircraft. Instead, aspects of the invention may be used in any vehicle having seats and an emergency exit with a removable door (or hatch). In addition to aircraft-based implementations described herein, aspects of the invention may be utilized in a passenger car of a rail vehicle such as a commuter train, or in a waterborne vehicle such as a ferry boat, without limitation.

Figure 1:
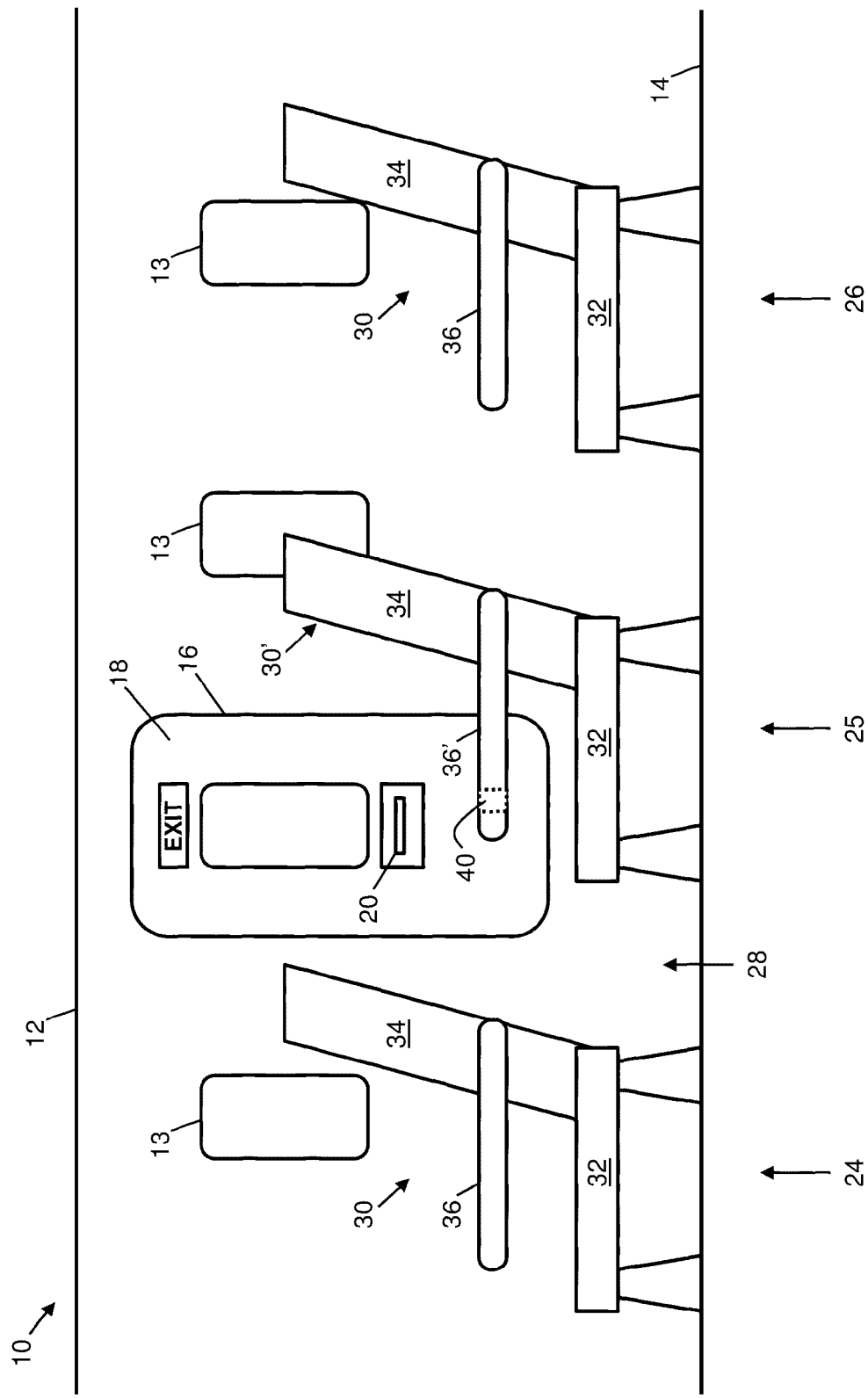
FIG. 1 depicts aspects of a system in a stowed position in accordance with embodiments of the invention.

FIG. 1 depicts a system in a stowed position in accordance with aspects of the invention. In particular, FIG. 1 shows a portion of an interior of a cabin of a vehicle 10. The cabin is defined by a sidewall 12 and a floor 14. In a preferred embodiment, the vehicle 10 comprises an aircraft and the sidewall 12 comprises a portion of the fuselage that defines a passenger cabin of the aircraft. The sidewall 12 may include a number of windows 13.

Figure 2:
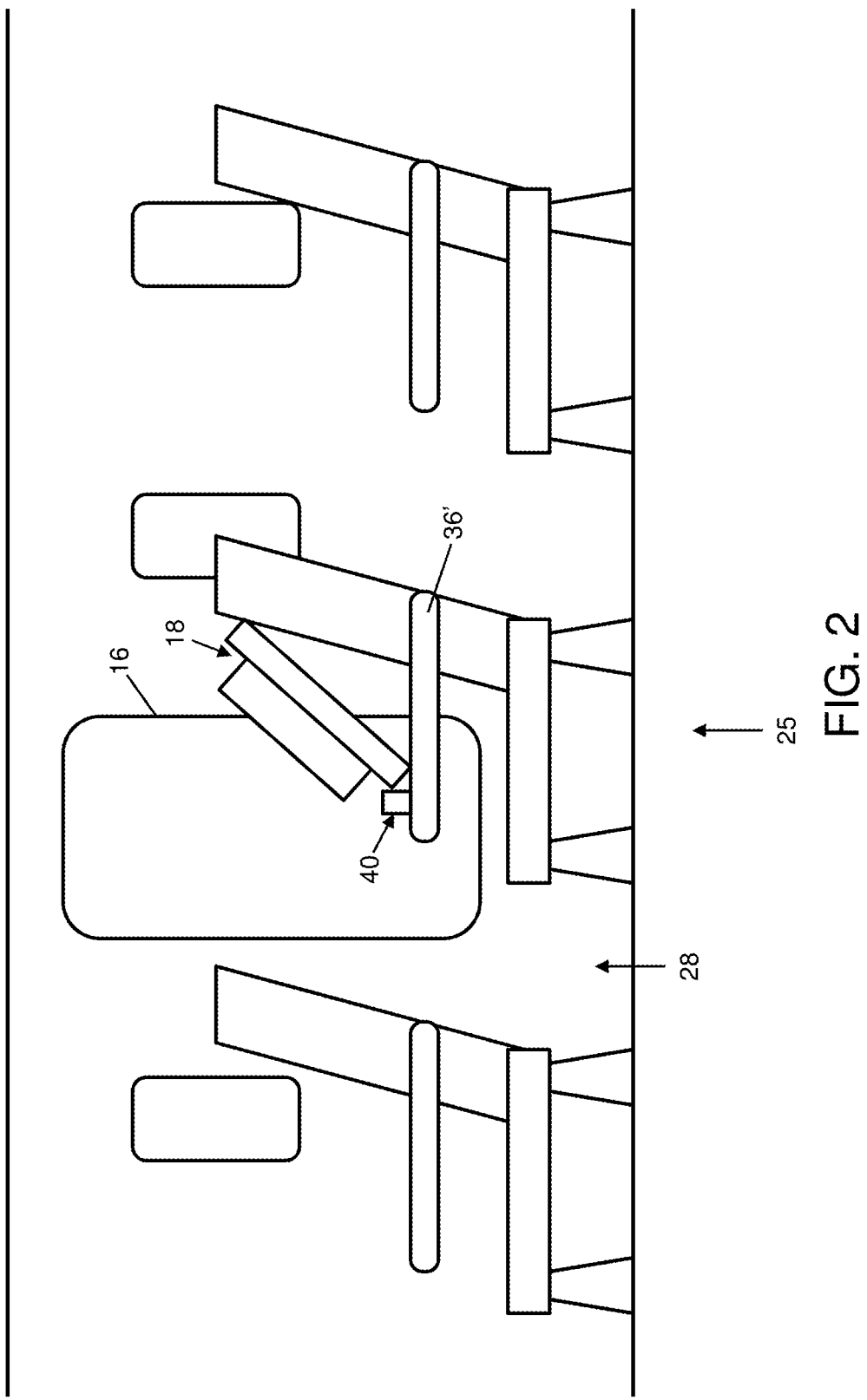
FIGS. 2 and 3 depict aspects of the system in a deployed position in accordance with embodiments of the invention.

Still referring to FIG. 1, the vehicle 10 includes an exit 16 in the form of an opening in the sidewall 12. In the aircraft embodiment, the exit 16 may be an overwing exit. During normal operation of the vehicle 10, a door 18 is arranged in and closes the exit 16. In an egress situation, such as an emergency exit from the cabin to outside the vehicle 10, the door 18 may be removed from the exit 16 (as shown in FIG. 2) to allow passengers to egress through the exit 16. The door 18 may include, for example, at least one handle 20 that may be manually actuated by a person in the cabin to release the door 18 from the exit 16 in a conventional manner.

With continued reference to FIG. 1, the vehicle 10 may include rows 24, 25, 26 of seats 30 in the cabin. The row 25 that is next to the exit 16 is referred to as the exit row. As shown in FIG. 1, row 24 is forward of the exit row 25 and row 26 is aft of the exit row 25. An egress path 28 for the exit 16 is defined between the seats of egress row 25 and the seats of row 24. Each row 24-26 may have any desired number of seats 30, such as one, two, three, or other number. The vehicle 10 may include more rows than the three rows 24-26 shown in FIG. 1.

Each seat 30 may include a seat portion 32, a back 34, and an armrest 36. The seats 30 may be constructed in any desired manner. According to aspects of the invention, at least one armrest 36' of at least one seat 30' in the exit row 25 includes a latch 40. FIG. 1 shows the latch 40 in a stowed position in the armrest 36', e.g., during normal operation of the vehicle 10 when the door 18 is arranged in the exit 16. In embodiments, in the stowed position the latch 40 does not extend higher than an upper surface of the armrest 36'. FIG. 2 shows the latch 40 in a deployed position, e.g., in an egress situation when the door 18 is removed from the exit 16.

Figure 3:
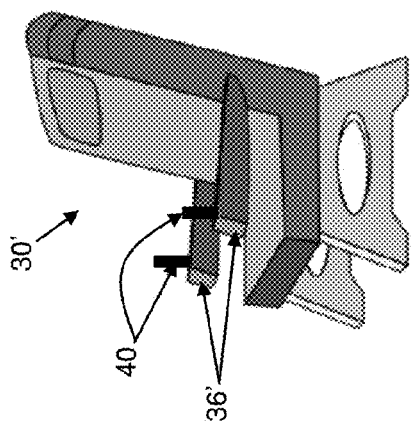

As shown in FIG. 2, the deployed latch 40 provides a structural element that extends upward from the top surface of the armrest 36' and that abuts an edge of the door 18 when the door 18 is placed on the top surface of the armrest 36'. According to aspects of the invention, the abutment of the latch 40 against the door 18 retains the door 18 on the armrest 36' and inhibits the door 18 from sliding off the armrest 36' into the egress path 28. The door 18 may have a convex shape that causes the door 18 to slide along the armrest 36' to a position where the door 18 contacts the deployed latch 40. A single latch 40 is described herein for illustrative purposes, but it should be understood that the exit row 25 may include plural latches 40 that all operate in the same manner. For example, FIG. 3 shows a seat 30' of the exit row 25 with a respective latch 40 in each armrest 36'. Moreover, an exit row 25 may include plural seats 30' of the type shown in FIG. 3.

In embodiments, the latch 40 comprises a structural element that is moveable relative to the armrest 36' from the stowed position (FIG. 1) to the deployed position (FIG. 2). In the deployed positon, at least a portion of the latch 40 extends upward from the top surface of the armrest 36'. The movement of the latch 40 relative to the armrest 36' (from the stowed positon to the deployed positon) may be translational and/or rotational movement.

The actuation of the latch 40 from the stowed position (FIG. 1) to the deployed position (FIG. 2) may be manual or automatic. In an exemplary manual embodiment, the latch 40 comprises an element hinged to the armrest 36' and the manual actuation includes a person touching the latch 40' (e.g., with their hand) to rotate the latch 40 relative to the armrest 36' to move the latch 40 from the stowed positon to the deployed positon. Another exemplary manual embodiment includes a manual trigger mechanism at the seat 30, such as a push button on the armrest 36' that, when pressed by a person causes the latch 40 to move from the stowed position to the deployed position.

In an automated embodiment, an action at the door 18 automatically causes the latch 40 to move from the stowed position to the deployed position. The action at the door 18 may comprise, for example, movement of the handle 20 beyond a threshold position or movement of the door 18 out of the exit 16. In embodiments, an actuation system 50 (shown in FIG. 4) detects the action at the door 18 and automatically deploys the latch 40 based on the detected action. The system 50 may comprise a mechanical system, an electrical system, or an electro-mechanical system. In one exemplary embodiment, the system 50 includes a sensor 52 that detects movement of the handle 20 beyond a threshold position (or removal of the door 18 out of the exit 16), and an actuator 54 that moves the latch 40 to the deployed position based on the detecting the by sensor 52. The sensor 52 may comprise any suitable sensor, such as a limit switch or a proximity sensor. The actuator 54 may comprise any suitable actuator, such as an electrical actuator or an electromechanical actuator (e.g., a solenoid actuator). An output signal of the sensor 52 may be provided directly to the actuator 54 (e.g., by wiring), or may be provided to a controller "C" that in turn provides a control signal to the actuator 54 (also by wiring). In another exemplary implementation, the system 50 comprises a system of mechanical linkages that are operatively connected between the handle 20 and the latch 40, whereby movement of the handle 20 is transmitted to the latch 40 (by the system of mechanical linkages) to cause the latch 40 to move from the stowed position to the deployed position. The invention is not limited by these examples, and any suitable system may be employed to automatically deploy the latch 40 based on an action at the door 18.

In automated embodiments, the latch 40 may be locked in the stowed position such that the latch 40 can only be automatically actuated by the system and cannot be manually actuated by a person. This reduces the likelihood of accidental damage to the latch 40 which might cause the system to malfunction.

In both manual and automated embodiments, the latch 40 may be configured to lock in the deployed position. For example, a mechanical lock system, such as a detent or other system, may be configured to hold the latch 40 in the deployed position when the latch is moved from the stowed position to the deployed position. In this manner, inadvertent stowing of the latch 40 is prevented.

Figure 5:
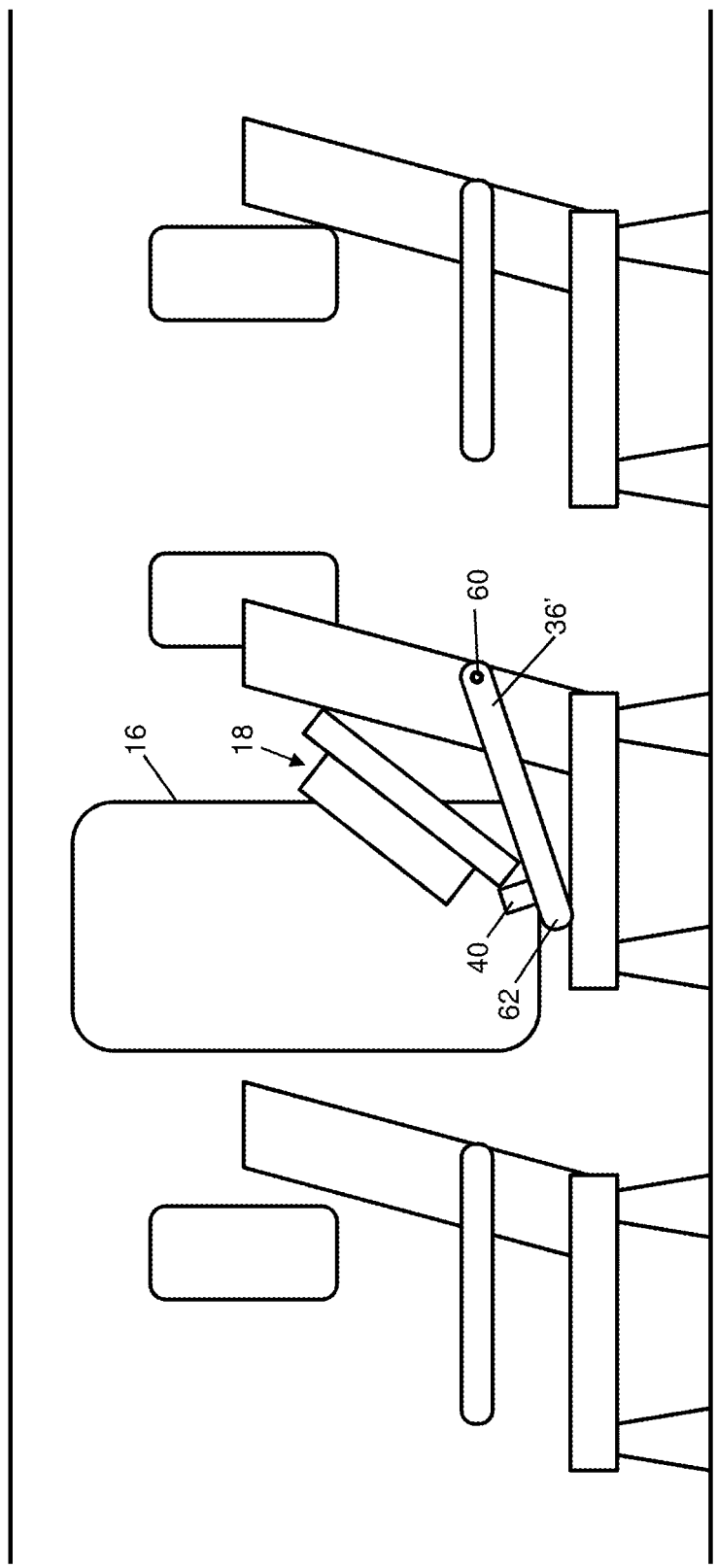
FIGS. 5 and 6 depict additional aspects of the system in accordance with embodiments of the invention.

FIG. 5 depicts a system in a deployed position in accordance with another aspect of the invention. In embodiments, the armrest 36' is configured to pivot about an axis 60 such that a distal end 62 of the armrest 36' moves downward. Moving the distal end 62 downward reduces the vertical distance required to lift the door 18 onto the armrest 36', which makes it easier for a person to lift and place the door 18 on the armrest 36'. As shown in FIG. 5, the latches 40 also deploy such that the door 18 is held on place on the armrest 36' despite the downward slope of the armrest 36'.

The pivoting of the armrest 36' may be manual or automated. In an exemplary manual embodiment, a single push button on the armrest 36' causes both deployment of the latch 40 and pivoting of the armrest 36'. In an exemplary automated embodiment, the pivoting of the armrest 36' may be controlled by the system 50 depicted in FIG. 4. For example, an actuator 64 may be configured to cause the pivotal movement of the armrest 36' based on the sensor 52 detecting the action at the door 18 as already described herein.

Figure 6:
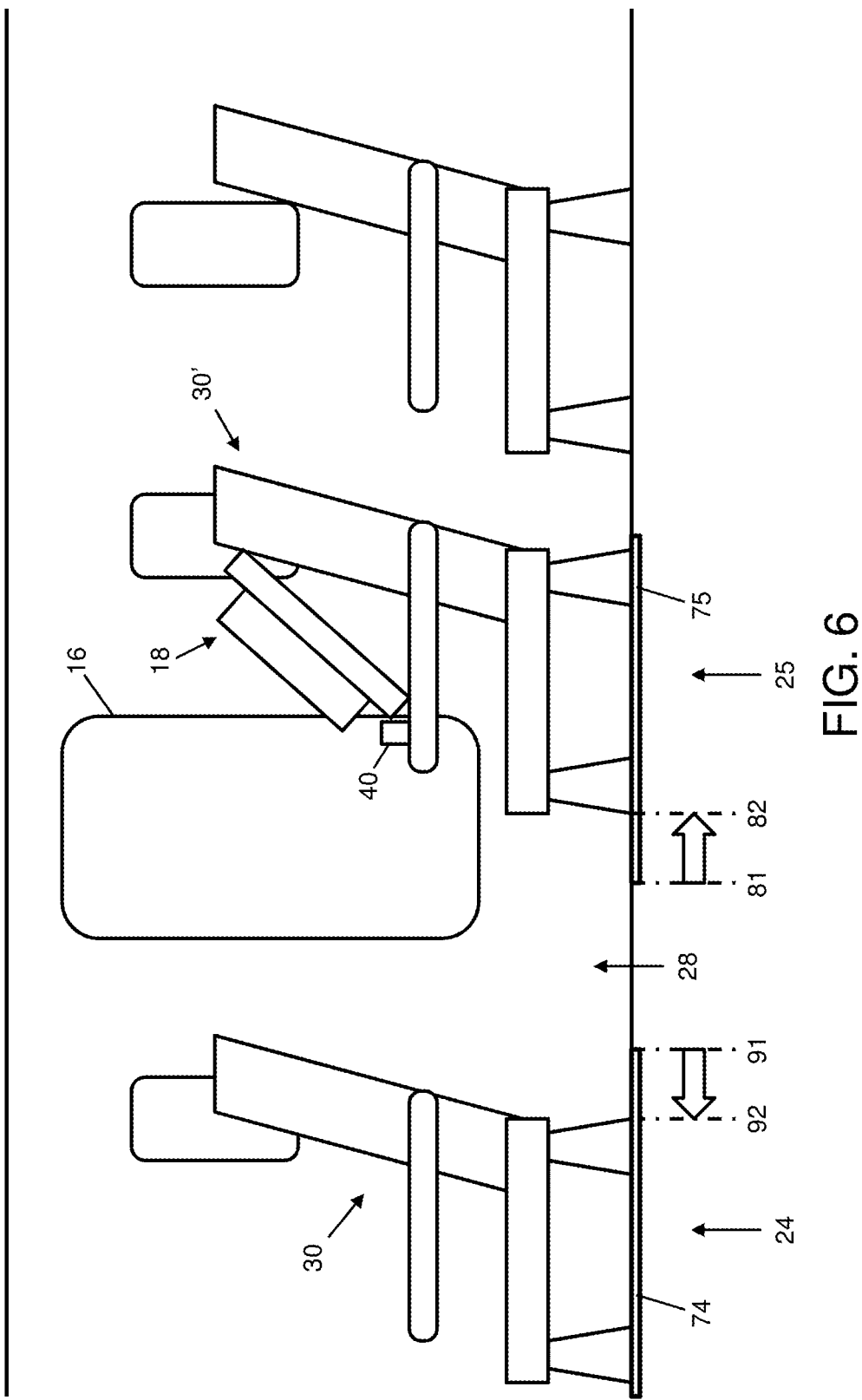

FIG. 6 depicts additional aspects of a system in accordance with embodiments of the present invention. As illustrated in FIG. 6, the seats of the exit row 25 and/or the seats of the row 24 immediately forward of the exit row 25 may be moved along the floor 14 to increase the size of the egress path 28. For example, the seats 30 of row 24 may be connected to the floor 14 by tracks 74, and the seats 30' of exit row 25 may be connected to the floor 14 by tracks 75. In embodiments, based on the sensor 52 detecting the action at the door 18 as described herein, an actuator may be configured to cause the seats 30' of exit row 25 to move in an aft direction along the tracks 75, e.g., from first positon 81 to second position 82. Additionally or alternatively, based on the sensor 52 detecting the action at the door 18 as described herein, an actuator may be configured to cause the seats 30 of exit row 24 to move in a forward direction along the tracks 74, e.g., from first positon 91 to second position 92.

Figure 4:
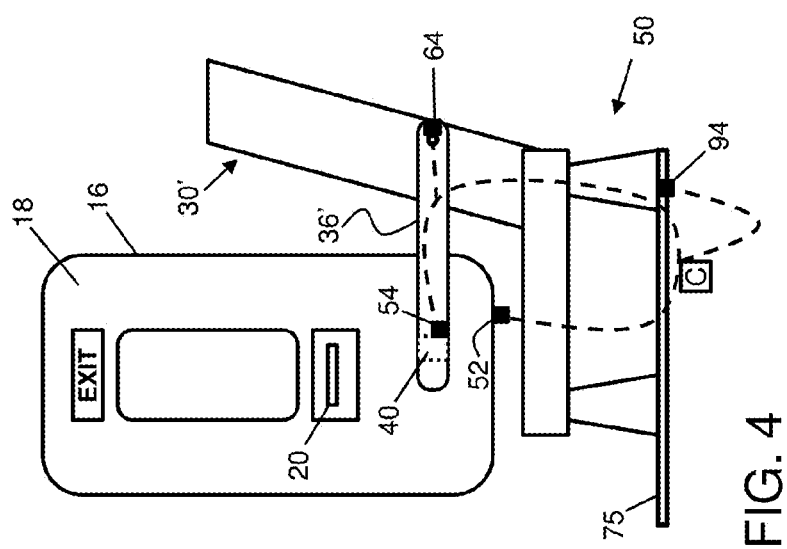
FIG. 4 depicts an actuation diagram in accordance with embodiments of the invention.

As shown in FIG. 4, an actuator 94 that moves the seats along the floor 14 may be provided control signals by the same controller C that causes the latches 40 to move to the deployed position for holding the door 18 on the armrest 36'. The actuator 94 and track 75 may comprise, for example, a rack and pinion gear system or other suitable actuation system. In embodiments, the system includes additional sensors configured to detect when passengers are out of row 24 prior to moving seats of row 24 forward. In embodiments, the system includes additional sensors configured to detect when passengers are out of row 26 prior to moving seats of row 25 aft.

Figure 7:
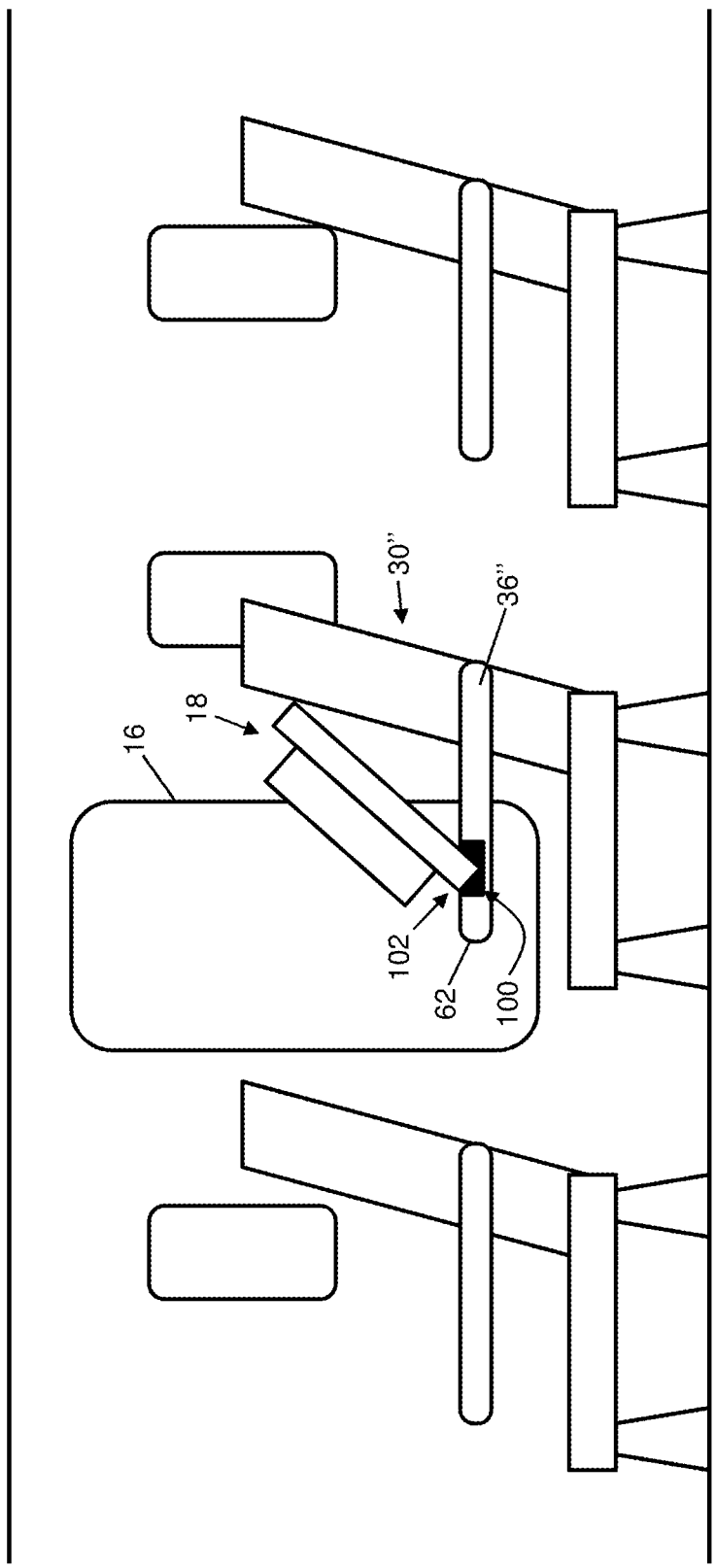
FIG. 7 depicts another system in accordance with embodiments of the invention.

FIG. 7 depicts an embodiment of another system in accordance with aspects of the invention. As shown in FIG. 7, the armrest 36" of the seat 30" in the exit row 25 is provided with a notch 100 near the distal end 62. The notch 100 has a size and shape that specifically corresponds to the size and shape of an edge 102 of the door 18. In this manner, the notch 100 is specially configured to engage and hold the edge 102 of the door 18 when the door 18 is placed on the upper surface of the armrest 36".

Figure 8:
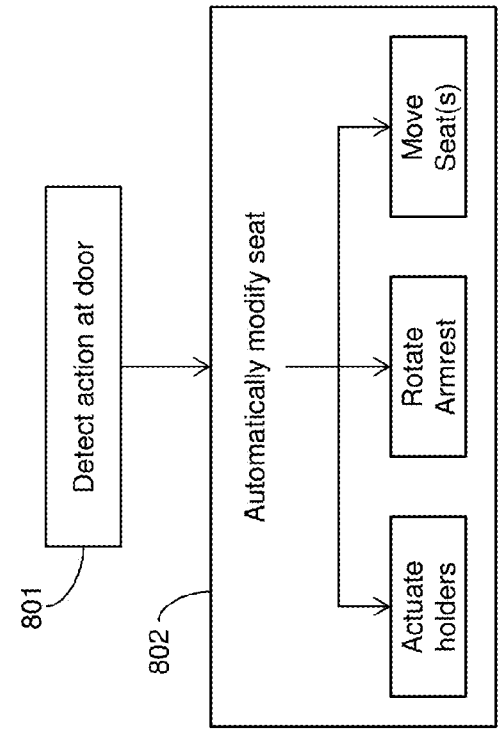
FIG. 8 shows a flowchart of a method in accordance with embodiments of the invention.

FIG. 8 shows a flowchart of a method in accordance with aspects of the invention. At step 801, a system detects an action at a door (e.g., door 18) associated with an exit (e.g., exit 16) of a vehicle (e.g., vehicle 10). In embodiments, the action comprises movement of a handle (e.g., handle 20) of the door beyond a threshold position, or movement of the door out of the exit. The system may detect the action at the door using, for example, a limit switch, position sensor, or mechanical linkage.

At step 802, based on the detecting the action at the door at step 801, the system automatically modifies a seat in the vehicle. The automatically modifying the seat may comprise at least one of: actuating a latch (e.g., latch 40) in an armrest (e.g., armrest 36') of the seat as described with respect to FIG. 2; rotating a distal end of the armrest downward as described with respect to FIG. 5; and moving the seat along the floor to increase the size of an egress path as described with respect to FIG. 6. The automatically modifying the seat may be accomplished using an electronic-based controller (e.g., controller C) and one or more actuators (e.g., as depicted in FIG. 4). When the exit row adjacent the exit includes more than one seat, step 802 may include automatically modifying all the seats in the exit row.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
  detecting an action at a door associated with an overwing exit at an exit row of an aircraft; and
  modifying a seat in the exit row based on the detecting the action at the door, wherein the modifying the seat comprises at least one of:
    automatically deploying a latch in an armrest of the seat;
    automatically rotating a distal end of the armrest downward; and
    automatically moving the seat to increase a size of an egress path of the exit row.

2. The method of claim 1, wherein a sensor performs the detecting.

3. The method of claim 1, wherein an actuation system performs the modifying.

4. The method of claim 1, wherein the detected action at the door comprises one of:
  movement of a handle of the door beyond a threshold position; and
  movement of the door out of the exit.

5. The method of claim 1, wherein the modifying the seat comprises both of:
  the automatically deploying the latch in the armrest of the seat; and
  the automatically rotating the distal end of the armrest downward.

6. The method of claim 5, further comprising locking the latch in a deployed position after the automatically deploying the latch.

7. The method of claim 1, wherein the modifying the seat comprises both of:
  the automatically deploying the latch in the armrest of the seat; and
  the automatically moving the seat to increase the size of the egress path of the exit row.

8. The method of claim 7, wherein the moving the seat comprises moving the seat in an aft direction along a floor of the aircraft.

9. The method of claim 8, further comprising, based on the detecting the action at the door, moving another seat in a forward direction along the floor of the aircraft.

10. The method of claim 7, further comprising locking the latch in a deployed position after the automatically deploying the latch.

* * * * *